Aug. 20, 1929.　　　T. L. IRVING　　　1,725,194
LICENSE PLATE CARRIER
Filed Feb. 13, 1928
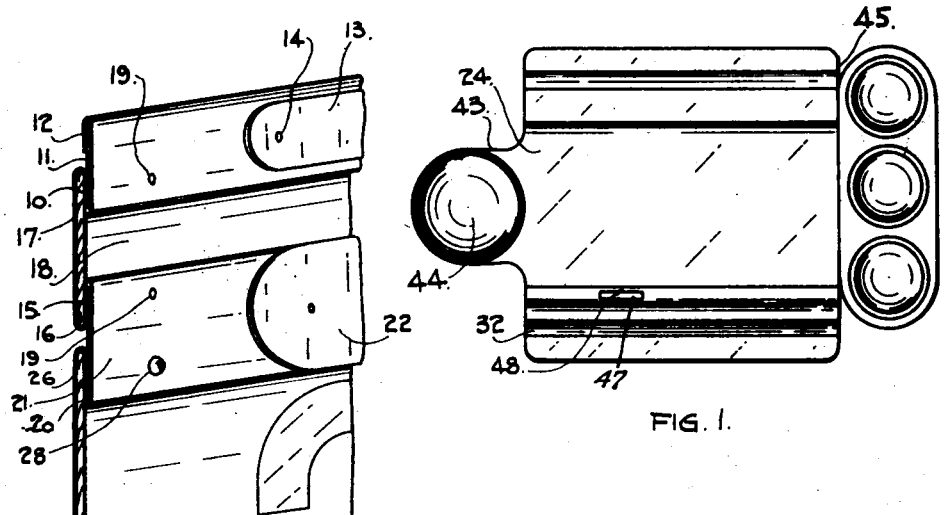
FIG. 1.
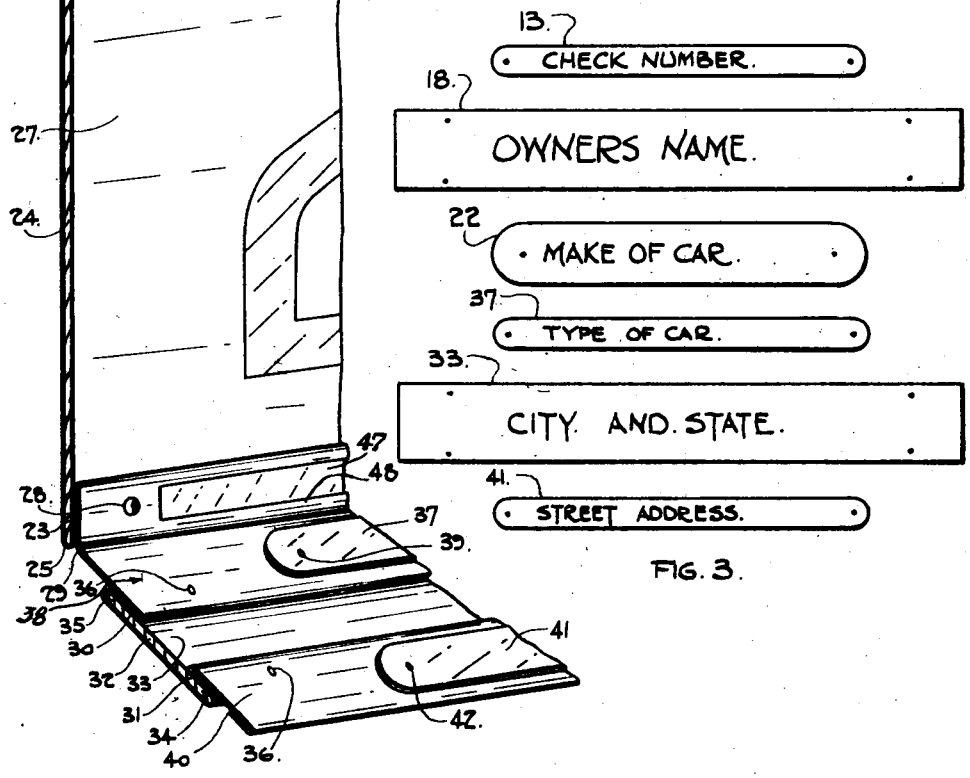
FIG. 2.
| 13. | CHECK NUMBER |
| --- | --- |
| 18. | OWNERS NAME |
| 22. | MAKE OF CAR |
| 37. | TYPE OF CAR |
| 33. | CITY AND STATE |
| 41. | STREET ADDRESS |
FIG. 3.
INVENTOR.
T. L. Irving.
By E. J. Featherstonhaugh
ATTORNEY.

Patented Aug. 20, 1929.

1,725,194

UNITED STATES PATENT OFFICE.

THOMAS LORNE IRVING, OF ST. ANICET, QUEBEC, CANADA.

LICENSE-PLATE CARRIER.

Application filed February 13, 1928. Serial No. 254,054.

The invention relates to a license plate indicator, as described in the present specification and illustrated in the accompanying drawings that form part of the same.

The invention consists essentially of the novel features of construction in the claim for novelty following a description containing an explanation in detail of an acceptable form of the invention.

The objects of the invention are to unmistakably identify the license number with the car and the owner and to so associate the owner with the car and license plate as to make any break in the relationship a criminal offense which can be readily detected; to insure a secure plate for the license plate and at the same time maintain the good appearance of the vehicle; to facilitate the reading of the license number by officers in charge of traffic and add information in regard to the name and address of the owner as well as furnish the assurance that the license plate belongs to the car in any dispute; to keep the license plate clear of mud and dirt, liable to make the figures indistinguishable and generally to provide a convenient and serviceable carrier for license plates with or without accessory lights.

In the drawings, Figure 1 is a plan view of the carrier.

Figure 2 is a sectional perspective view of the carrier enlarged in respect to Figure 1.

Figure 3 is a group of slip plates and rivet plates identified with the carrier.

Referring to the drawings, the carrier is preferably formed of sheet metal in a plurality of folds to form slip pockets and identification supports and surfaces.

The first fold 10 extends downwardly from a plate support 11, which is again folded over at the upper end 12 for stiffening purposes.

The plate 11 carries the number plate 13, which is secured to the plate support 11 by the rivets 14. The main plate is then bent upwardly in the fold 15 at the required distance from the fold 10 forming the plate socket 16, which with the plate socket 17 receives the name plate 18, which is slipped therein and held by the rivets 19 through the folds 10 and 15. This name plate is thus permanently associated with the car, that is to say, with the check number on the plate 13 and cannot be disassociated therefrom except by breaking up the plate.

The fold 20 made in a downward direction is spaced from the fold 15 to form a name plate 21 for the make of car. This may be put on by means of a riveted plate 22 or directly on the plate formed by the spaced folds as desired by the manufacturer.

The fold 23 is made upwardly and spaced from the fold 20 to form a license plate pocket 24 having the sockets 25 and 26 into which the license plate 27 is inserted, and held by the bolt 28 secured by nuts behind the bolt drawing the folds 20 tightly to the license plate, thereby locking the nuts by means of the spring of the carrier plate itself.

The license plate itself carries information regarding its year and its origin in addition to the number, consequently the identification with the car and the owner is easily made.

The carrier plate is now offset at 29 outwardly and extends to the downward fold 30, spaced from the lower fold 31 to form a pocket 32 for the city or State plate 33, which is slipped into the sockets 34 and 35 and held by the rivets 36 through the upper fold 30. The offset below the license plate pocket forms the lower portion of the plate into a mud guard for the license plate. The name plate 37 has the type of car thereon, and is preferably mounted on the plate 38 and held by the rivets 39, this mounted plate specifying whether the car is a sedan, touring, coach, roadster, truck or delivery wagon as well as any other form of conveyances such as aeroplanes, seaplanes, boats and all sorts of vehicles where an identification system would be of use.

The fold 31 extends downwardly to form the mounting 40 for the plate 41, having a street address thereon, this plate 41 being secured by the rivets 42.

The carrier plate offers also a great convenience for the mounting of rear lights and consequently one side is extended to form a bracket 43 to carry the tail light 44. This tail light is removed before the insertion of the plate and afterwards securely attached, consequently the license plate is securely locked into position by this tail light as well as by the bolts and nuts aforesaid, as at the other end 45 of the carrier plate the various pockets are closed.

The end 45 of the carrier plate is also useful for carrying stop and direction lights, which are now frequently used in a group of three vertically arranged and colored red, green, yellow or white as the case may be, so that the complete carrier for license plate and lights is quite an ornamental piece secured permanently to the vehicle by the makers, and each year the license plate is changed in this carrier while the other information remains the same, naturally the information may be varied somewhat according to the conditions of use, the main features being to identify with one another the check number of the car, whether it is an engine or serial number, the owner's name and the license plate, and to these may be added the make of the car and type of car as two very essential pieces of information that will add to identification and avoid thieving, for in the first place, the plate has attached thereto in any suitable manner the number strip 47 corresponding to the check number of the car and appearing through the window 48 made in the fold 23, thus the number on the strip 47 must always agree with the check number on the plate 13.

There are so many ways of putting this number on the license plate it seems to be unnecessary to specify the numerous methods employed, but it may be printed numbers closed in by celluloid windows or it may be metal numbers or numbers stamped out of metal plates riveted to the license plate, the main feature being to identify the license plate with the number permanently attached to the carrier.

It will be thus seen that there are many precautions taken in this particular device for eliminating theft of motor vehicles, because under present conditions a license plate is not very securely attached to the vehicle, just sufficient to prevent it falling off, but the most unskilled person can remove a license plate and attach another in its place to a stolen car, thus blocking the investigation at the very start for the recovery of the car. In the present instance the police can at once identify the plate with the car and the owner and if there is any falsification in the matter, the driver of the car is immediately arrested and almost convicted by the circumstances before trial.

The carrier may be permanently secured to the car by the manufacturer and the name of the car and the engine number lithographed thereon, other information can readily be supplied by the owner and the plates prepared by modern methods well known to commerce.

It is of course naturally understood that the identification means could be placed together with the car license all on the car license plate according to the requirements necessitating such a change.

What I claim is:

In a license plate indicator, a holder formed of a metal plate having grooves forming slip pockets for license plate and owner's name and transverse faces for other identifying information and an offset intermediate of its depth and below the license plate pocket forming the lower portion of the plate into a mud guard for the license plate.

Signed at Montreal, Can., this 14th day of December, 1927.

THOMAS LORNE IRVING.